(12) United States Patent
Grebe et al.

(10) Patent No.: US 9,162,392 B2
(45) Date of Patent: Oct. 20, 2015

(54) APPARATUS FOR AVOIDING DEPOSITS ON OPTICAL COMPONENTS IN THE LASER SINTERING PROCESS

(71) Applicants: Maik Grebe, Bochum (DE); Sigrid Hessel-Geldmann, Haltern am See (DE); Wolfgang Diekmann, Waltrop (DE)

(72) Inventors: Maik Grebe, Bochum (DE); Sigrid Hessel-Geldmann, Haltern am See (DE); Wolfgang Diekmann, Waltrop (DE)

(73) Assignee: Evonik Industries AG, Essen (DE)

( * ) Notice: Subject to any disclaimer, the term of this patent is extended or adjusted under 35 U.S.C. 154(b) by 394 days.

(21) Appl. No.: 13/658,325

(22) Filed: Oct. 23, 2012

(65) Prior Publication Data

US 2013/0101803 A1 Apr. 25, 2013

(30) Foreign Application Priority Data

Oct. 25, 2011 (DE) .......................... 10 2011 085 154

(51) Int. Cl.
| | | |
|---|---|---|
| *B29C 35/08* | (2006.01) | |
| *B32B 3/26* | (2006.01) | |
| *B29C 67/24* | (2006.01) | |
| *B29C 67/00* | (2006.01) | |
| *B22F 3/105* | (2006.01) | |

(52) U.S. Cl.
CPC ............. *B29C 67/007* (2013.01); *B22F 3/1055* (2013.01); *B29C 67/0085* (2013.01); *B22F 2003/1056* (2013.01); *Y10T 428/24612* (2015.01)

(58) Field of Classification Search
CPC ............ B29C 67/0077; B29C 67/0085; B22F 3/1055; B22F 2003/1056; Y10T 428/24612
USPC ........................ 264/497, 401, 40.1, 407, 463; 425/174.4, 169–170, 150
See application file for complete search history.

(56) References Cited

U.S. PATENT DOCUMENTS

| | | | |
|---|---|---|---|
| 5,732,323 | A | 3/1998 | Nyrhilä |
| 6,136,948 | A | 10/2000 | Dickens, Jr. et al. |
| 6,531,086 | B1 | 3/2003 | Larsson |
| 6,554,600 | B1 | 4/2003 | Hofmann et al. |
| 8,801,418 | B2 * | 8/2014 | El-Siblani et al. ......... 425/174.4 |

(Continued)

FOREIGN PATENT DOCUMENTS

| | | |
|---|---|---|
| DE | 695 11 881 T2 | 1/2000 |
| DE | 103 42 882 A1 | 5/2005 |

(Continued)

OTHER PUBLICATIONS

European Search Report issued Jan. 23, 2013 in European Patent Application No. 12 00 7273.1 (with English Translation of Categories of Cited Documents).

*Primary Examiner* — Nahida Sultana
(74) *Attorney, Agent, or Firm* — Oblon, McClelland, Maier & Neustadt, L.L.P.

(57) ABSTRACT

The present invention provides a process and an apparatus for the layer-by-layer production of three-dimensional objects, wherein material vapors formed during processing in the construction chamber are prevented from deposition on apparatus components by exposing the gases to deposition surfaces where the materials condense and deposit.

11 Claims, 4 Drawing Sheets

(56) References Cited

U.S. PATENT DOCUMENTS

| | | |
|---|---|---|
| 2005/0116391 A1* | 6/2005 | Lindemann et al. ........... 264/497 |
| 2005/0235656 A1 | 10/2005 | Desbiolles et al. |
| 2007/0026145 A1 | 2/2007 | Lindemann et al. |
| 2008/0063867 A1* | 3/2008 | Schlienger et al. ........... 428/402 |
| 2009/0206522 A1* | 8/2009 | Hein et al. .................... 264/497 |
| 2010/0006228 A1* | 1/2010 | Abe et al. ...................... 156/356 |
| 2010/0320648 A1* | 12/2010 | Jamar et al. ................... 264/401 |
| 2011/0122381 A1 | 5/2011 | Hickerson et al. |
| 2011/0252618 A1 | 10/2011 | Diekmann et al. |
| 2012/0202012 A1 | 8/2012 | Grebe et al. |
| 2013/0216836 A1* | 8/2013 | Grebe et al. ................ 428/411.1 |
| 2014/0027953 A1* | 1/2014 | Costabeber ................... 264/401 |
| 2014/0263221 A1* | 9/2014 | Minehara ................ 219/121.73 |
| 2015/0045198 A1* | 2/2015 | Basily et al. .................. 493/454 |

FOREIGN PATENT DOCUMENTS

| | | |
|---|---|---|
| DE | 103 42 883 A1 | 5/2005 |
| DE | 10 2006 044 043 A1 | 3/2008 |
| EP | 1015214 A1 | 7/2000 |
| EP | 1037739 | 9/2000 |
| EP | 1 514 622 A1 | 3/2005 |
| EP | 1 839 781 A2 | 10/2007 |
| EP | 1 839 781 A3 | 10/2007 |
| WO | WO 96/06881 | 3/1996 |
| WO | WO 01/38061 A1 | 5/2001 |
| WO | WO 2005/025780 A1 | 3/2005 |
| WO | WO 2005/105412 A1 | 11/2005 |

* cited by examiner

Fig. 1

PRIOR ART

APPARATUS FOR AVOIDING DEPOSITS ON OPTICAL COMPONENTS IN THE LASER SINTERING PROCESS

CROSS REFERENCE TO RELATED APPLICATIONS

This application claims priority to German Application No. 102011085154.2, filed Oct. 25, 2011, the disclosure of which is incorporated herein by reference in its entirety.

BACKGROUND OF THE INVENTION

The present invention relates to an apparatus for the layer-by-layer production of three-dimensional objects, to processes for layer-by-layer production, and also to corresponding mouldings.

The rapid provision of prototypes is a task frequently encountered in very recent times. Processes which permit the rapid provision of a prototypes are described as rapid prototyping, rapid manufacturing, or as an additive fabrication process. Particularly suitable processes the rapid provision of a prototype are based on selective melting and solidification of pulverulent materials which are produced in a layer-by-layer manner through selective melting and solidification of the pulverulent material according to a pattern of the prototype object under construction. Supportive structures for overhangs and undercuts are not required in such a process, because the powder bed surrounding the molten regions provides adequate support. Correspondingly, as no supports are employed, a subsequent task of removing supports is not required. These processes are also suitable for short-run production. The temperature of the construction chamber is selected in such a way as to avoid distortion of the structures produced layer-by-layer during the construction process.

One process which has particularly good suitability for rapid prototyping/rapid manufacturing is selective laser sintering (SLS). In this process, plastics powders in a chamber are selectively briefly exposed to a laser beam, and the powder particles impacted by the laser beam therefore melt. The molten particles coalesce and rapidly solidify again to give a solid mass. This process can produce three-dimensional structures simply and rapidly by constantly applying new layers and repeatedly exposing them to laser light to melt and subsequently coalesce in the form of the three dimensional object.

The laser sintering (rapid prototyping) process for producing mouldings from pulverulent polymers is described in detail in the U.S. Pat. No. 6,136,948 and WO 96/06881 (both DTM Corporation). A wide variety of polymers and copolymers is claimed for this application, and includes polyacetate, polypropylene, polyethylene, ionomers and polyamide, for example.

Other processes with good suitability are the Selective Inhibition of Bonding (SIB) process as described in WO 01/38061 and in EP 1015214. Both processes operate with large-surface-area infrared heating to melt the powder. The selectivity of the melting process is achieved in the first case by applying an inhibitor, and in the second process by a mask. DE 10311438 describes a further process, wherein the energy needed for the fusion process is introduced via a microwave generator, and the selectivity is achieved by applying a susceptor. WO 2005/105412 describes a method where the required energy for the fusion process is introduced via electromagnetic radiation, and the selectivity is achieved by applying an absorber.

A common problem incurred with the above described conventional processes is that constituents of the polymeric powder are released or vaporized when the polymeric powders are heated. The substances or vapours which are released disrupt the process, because they condense on important components of the production apparatus, such as lenses, pyrometer or mask, and impair their function.

The constituents released often involve monomers, oligomers or additives which have a markedly lower melting point than the polymer. The content of monomers and oligomers in the polymer can be reduced, but this incurs considerable additional costs. Furthermore, in most cases the polymer still comprises residues of substances which can be released as vapours upon heating.

SUMMARY OF THE INVENTION

An object of the present invention is therefore, to provide an improved process for layer-by-layer production of three-dimensional objects wherein vapours which are produced are prevented from condensation and deposition on sensitive components, e.g. lenses.

A further object of the present invention is to provide a production apparatus in which the improved process can be conducted.

These and other objects have been achieved by the present invention, the first embodiment of which includes an apparatus for layer-by-layer production of three-dimensional objects, comprising:
a radiation source which emits an electromagnetic radiation;
a control unit for control of a beam of the electromagnetic radiation;
a lens in a path of the electromagnetic radiation beam;
at least one deposition surface; and
a construction chamber, the construction chamber comprising:
an adjustable-height construction platform, and
an apparatus for applying, onto the construction platform,
a layer of a material hardenable by exposure to electromagnetic radiation, wherein
the lens directs the beam of electromagnetic radiation to an object point of the layer of hardenable material on the construction platform, and
the at least one deposition surface is located within the construction chamber, outside the construction chamber or both within and outside the chamber.

In a preferred embodiment, the deposition surface is located outside the construction chamber, and the apparatus further comprises:
piping leading from the construction chamber to the deposition surface, and
piping leading from the deposition surface back into the construction chamber.

In a further preferred embodiment, the present invention provides a process for layer-by-layer production of a three-dimensional object, which is conducted in the apparatus of the first embodiment or variations thereof which are described herein. The process comprises: applying a layer of a material which is hardenable by exposure to electromagnetic radiation onto the construction platform; focusing the beam of electromagnetic radiation through the lens on the material layer; selectively melting the material under the focus of the beam according to the control unit to obtain a completed layer; continuously adding a further layer of the material which is hardenable over the completed layer and repeating the controlled melting until the three dimensional object is formed; wherein material vapours formed during the process condense and deposit on the at least one deposition surface.

DETAILED DESCRIPTION OF THE INVENTION

In a first embodiment, the present invention provides an apparatus for layer-by-layer production of three-dimensional objects, comprising:

a radiation source which emits an electromagnetic radiation; a control unit for control of a beam of the electromagnetic radiation;

a lens in a path of the electromagnetic radiation beam;

at least one deposition surface; and a construction chamber, the construction chamber comprising:

an adjustable-height construction platform, and an apparatus for applying, onto the construction platform, a layer of a material hardenable by exposure to electromagnetic radiation, wherein the lens directs the beam of electromagnetic radiation to an object point of the layer of hardenable material on the construction platform, and the at least one deposition surface is located within the construction chamber, outside the construction chamber or both within and outside the chamber.

In a preferred embodiment, the deposition surface is located outside the construction chamber, and the apparatus further comprises:

piping leading from the construction chamber to the deposition surface, and piping leading from the deposition surface back into the construction chamber.

The present invention further provides a process for layer-by-layer production of a three-dimensional object, which is conducted in the apparatus of the first embodiment or variations thereof which are described herein. The process comprises: applying a layer of a material which is hardenable by exposure to electromagnetic radiation onto the construction platform; focusing the beam of electromagnetic radiation through the lens on the material layer; selectively melting the material under the focus of the beam according to the control unit to obtain a completed layer; continuously adding a further layer of the material which is hardenable over the completed layer and repeating the controlled melting until the three dimensional object is formed; wherein material vapours formed during the process condense and deposit on the at least one deposition surface.

With reference to the Figures, the present invention firstly provides an apparatus for the layer-by-layer production of three-dimensional objects comprising a construction chamber (19) with an adjustable-height construction platform (6), with an apparatus (7) for applying, onto the construction platform (6), a layer of a material hardenable by exposure to electromagnetic radiation, and with irradiation equipment comprising a radiation source (1) emitting electromagnetic radiation, and comprising a control unit (3), and comprising a lens (8) located in the beam path of the electromagnetic radiation, for the irradiation of points corresponding to the object (5) in the layer, where the apparatus has at least one deposition surface (9, 13, 18) located within the, or outside of the, construction chamber. An essential feature of the present invention is the deposition surface which is located within the, or outside of the, construction chamber, and on which the vapours produced during the melting of the polymeric material condense in a controlled manner. To this end, the deposition surface may be a cooled surface. It may be moreover preferable that the apparatus has a heating element for controlling the temperature of the construction chamber. It may thus be possible to adjust the construction chamber to a temperature which is optimal for the production of the three-dimensional object.

Surprisingly, it has been found that use of an apparatus with cooled surfaces on which the vapours cool and condense may inhibit condensation on sensitive components of an apparatus for producing three-dimensional objects via a layer-by-layer process. In conventionally known apparatuses an attempt is made to reduce condensation on sensitive components by flushing the components with large volumes of inert gas. However, the large-volume stream of an inert gas disrupts temperature control during the production of three-dimensional objects, in that the object to be produced and the surrounding powder are excessively cooled. Thus, the object to be produced may then be subject to severe warpage.

Conventionally known apparatuses have achieved only incomplete inhibition of condensation as described above. Furthermore, the vapours condense without hindrance on components not protected by the inert-gas flushing. This incurs increased cleaning cost after the construction process for producing three-dimensional objects. Finally, the apparatuses known to the person skilled in the art are hardly capable of processing polymeric materials with relatively high susceptibility to formation of vapours. The apparatus according to the invention reduces the level of risk inherent in the process, since condensation on sensitive components is inhibited. The apparatus according to the invention therefore, may also permit the processing of polymeric materials with relatively high susceptibility to formation of vapours during sintering or melting, e.g. nylon-6, or nylon-6,6. Cleaning cost may thus be substantially reduced. By virtue of the deposition surfaces (9, 13, 18) according to the invention, the apparatus according to the invention may not require flushing of the construction chamber (19) with large volumes of inert gas. According to some preferred embodiments, condensation of the vapours through cooling may be achieved only via the deposition surfaces (9, 13, 18).

In one embodiment of the present invention, the apparatus may have a deposition surface (9) located within the construction chamber. In an alternative embodiment, the location of the deposition surface may also be outside of the construction chamber. According to such alternative embodiments, during the production of the three-dimensional objects, the construction-chamber atmosphere is conducted past the deposition surface located outside of the construction chamber. In the simplest embodiment, the apparatus has, for this purpose, piping through which the gas of the construction-chamber atmosphere is conducted out of the construction chamber past the deposition surface (13) on which the vapours condense, and is then conducted back into the construction chamber.

The deposition surface provided for the deposition of the vapours may preferably be larger than 10 000 mm², more preferably larger than 20 000 mm², and very particularly preferably larger than 40 000 mm². The deposition surface made available for the deposition of vapours produced may thus be adequate for the intended purpose.

The deposition surface may have any desired geometric shape. In one possible embodiment the deposition surface may be a compact body, wherein the external areas serve as deposition surfaces. Advantageous deposition surfaces may be those based on geometric bodies in which the surface-to-volume ratio (S/V ratio) is greater than 1 mm$^{-1}$. The deposition surfaces may particularly advantageously be based on bodies which have a S/V ratio of more than 2 mm$^{-1}$, and very particularly preferably more than 4 mm$^{-1}$. It may moreover also be advantageously possible that the deposition surface involves a hollow body, in particular that the hollow body has a grid-type filler material. The grid-type filler material provides an adequately large surface for the deposition of vapours produced. It is preferable that the deposition surface has an internal or external cooling system which adjusts the temperature of the deposition surface to an appropriate temperature for the material of construction. In the case of compact bodies, the cooling system may be present in the body itself, for example in the form of a system of lines that convey coolant. It may also be possible that the cooling of the deposition surface is achieved by cooling elements that are in contact externally. The emissivity of the surfaces should preferably be smaller than 0.90. The emissivity of the surfaces should particularly preferably be smaller than 0.70. The emissivity of the surfaces should very particularly preferably be smaller than 0.50.

The location of the deposition surface may in principle be at any desired position in the construction chamber, but it may be preferable that the deposition surface is in the spatial vicinity of the components to be protected, in particular in the vicinity of the lens or the pyrometer.

The apparatus according to the invention is explained below with reference to the figures.

Figure 1:
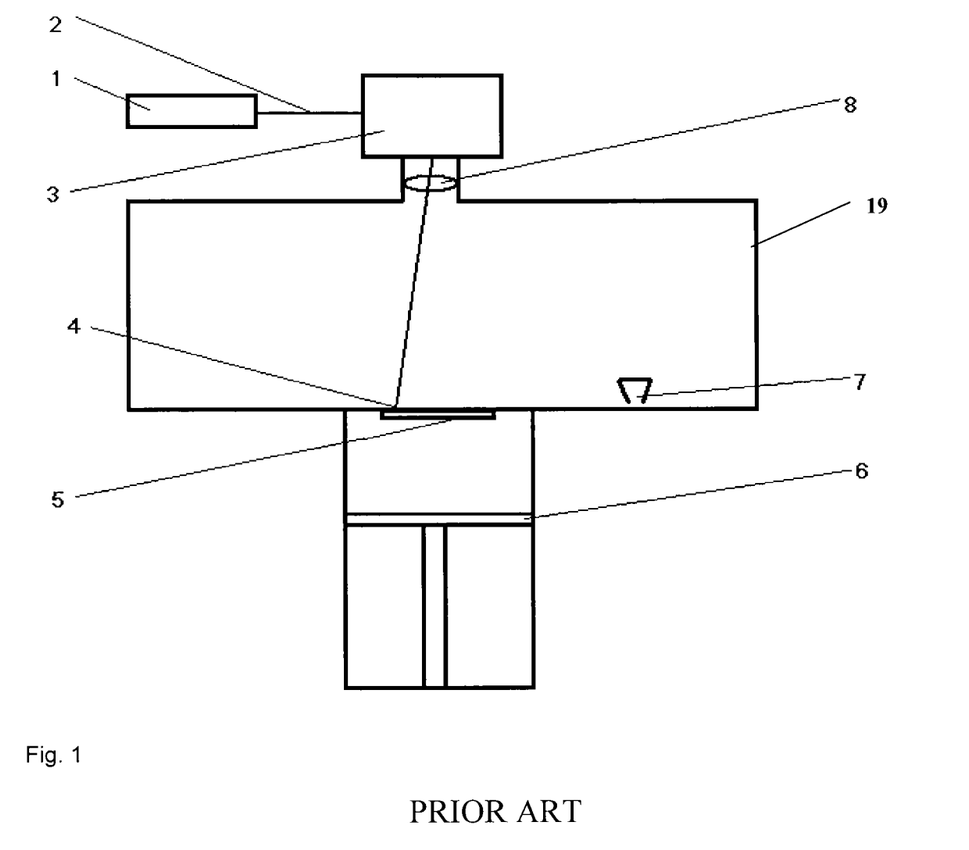
FIG. 1 shows a schematic diagram of a conventional layer-by-layer production apparatus.

FIG. 1 shows a schematic construction of a conventional apparatus for producing three-dimensional objects. The component is positioned centrally in the construction area. The laser beam (2) from a laser (1) is deflected by means of a scanner system (3) through the lens (8) onto a temperature-controlled and inertized (nitrogen) powder surface (4) of the object (5) to be formed. The lens has the function of separating the remaining optical components, e.g. the mirrors of the scanner, from the construction-chamber atmosphere. The lens is often designed as F-theta lens system, in order to ensure maximum homogeneity of focus over the entire operating area. Within the construction chamber, there is the applicator (7) for applying, onto the construction platform (6), the material that is to be hardened. The application equipment may, for example, be of the form of a trough or hopper, which can be displaced by a suitable displacement drive within the construction chamber (19) and over the construction platform (6). The applicator in the form of a trough can be mounted on a support apparatus in such a way that the trough is displaceable within a plane parallel to the construction platform (6) in a direction perpendicular to the longitudinal direction of the trough over the open upper side of the container. For this Each end of the trough has been mounted displaceably on a guide rail running parallel to, or along, the adjacent container wall. The displacement is achieved by a displacement apparatus with a drive, and this apparatus may take the form of a spindle apparatus, cable-pull apparatus or chain apparatus known per se for the stepless parallel displacement of the trough.

In the apparatuses available commercially for producing three-dimensional objects, the lenses are usually cooled, in order to avoid damage by excessive temperatures. However, this has the disadvantage that the vapours condense preferentially on the cooled lenses. Attempts are therefore made to direct a flow of inert gas onto the lens in such a way as to prevent the volatile constituents from condensing on the lens.

Figure 2:
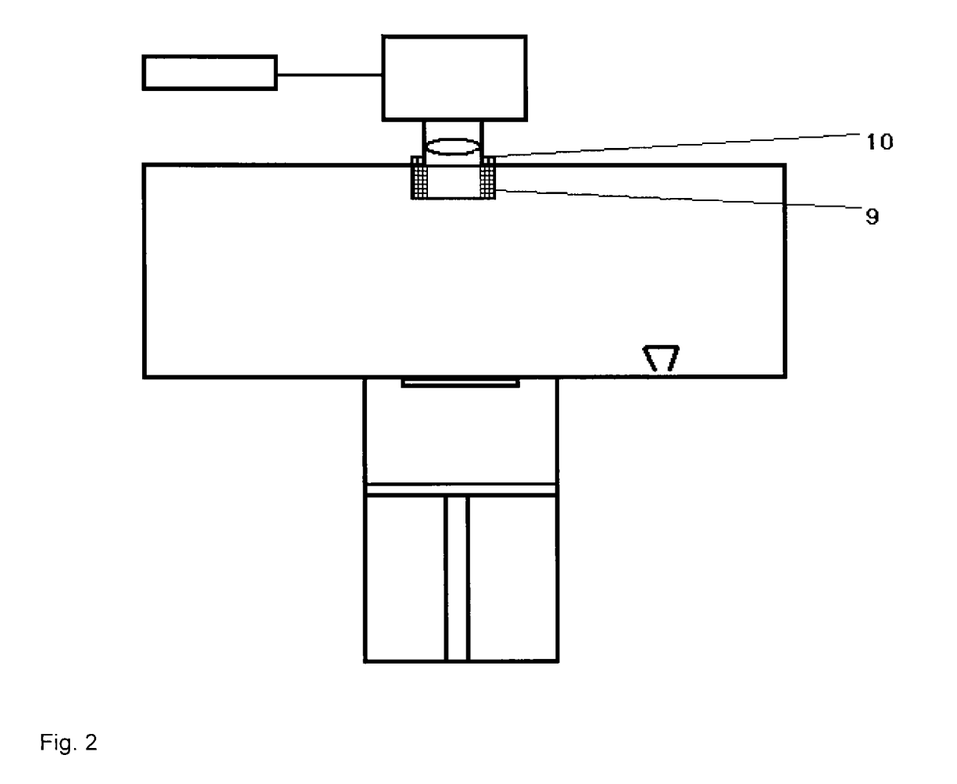
FIG. 2 shows a schematic diagram of a layer-by-layer production apparatus according to one embodiment of the present invention.

According to the embodiment of the present invention shown in FIG. 2, the vapours produced during the processing of the polymeric material may condense on the additionally installed cooled deposition surfaces (9). This prevents the said vapours from approaching lens and pyrometer and condensing on these units. The geometry of the deposition surface is selected in such a way as to maximize the available surface on which the vapours can condense. The positioning of the deposition surface may preferably be such to permit easy cleaning, or easy dismantling and cleaning. The position of the apparatus may preferably be selected in such a way that the vapours must flow past the cooled areas before the vapours come into contact with sensitive components, such as lens and pyrometer. The temperature of the deposition surfaces may be adjusted by cooling elements (10) in such a way that the vapours condense on the said surfaces. Since, however, cold components in the construction chamber can disrupt the construction process, the temperature at the condensation areas may also not adjusted to be much colder than absolutely necessary to effect deposition of the material vapours. The temperature of the areas may be from 10° C. to 350° C. below the process temperature, preferably from 20° C. to 200° C., with preference from 20° C. to 180° C., particularly preferably from 30° C. to 150° C., very particularly preferably from 30° C. to 140° C. and in particular from 30° C. to 80° C. below the process temperature.

Figure 3:
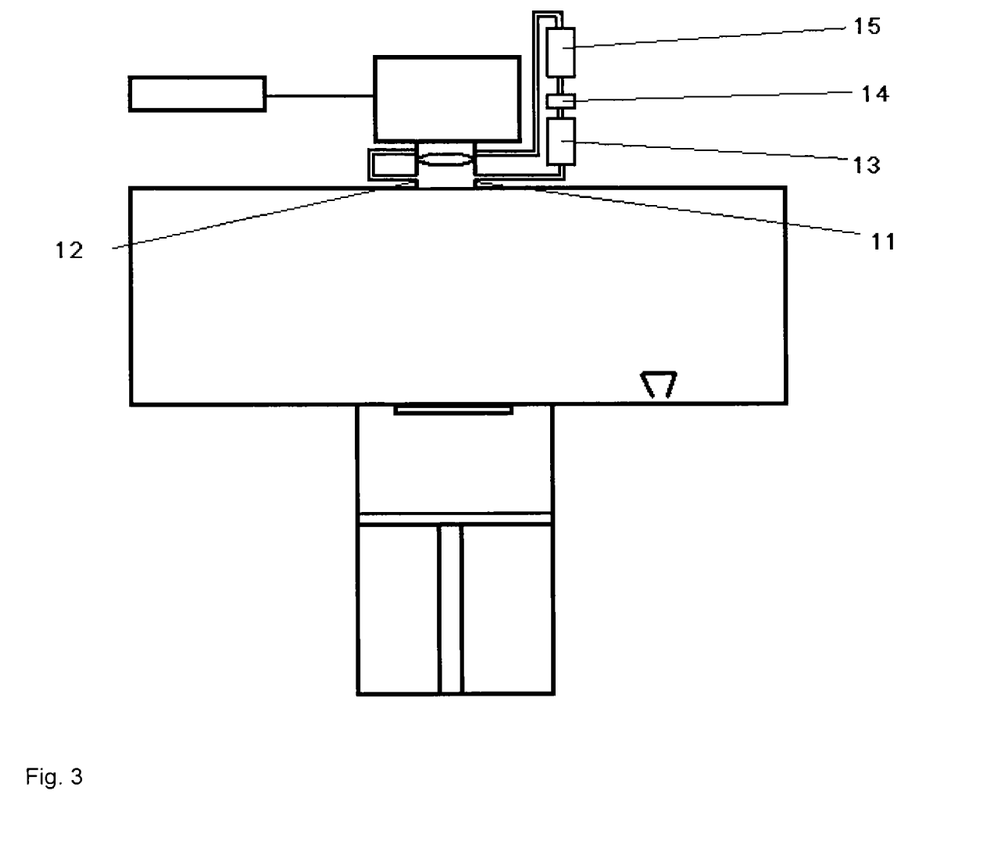
FIG. 3 shows a schematic diagram of a layer-by-layer production apparatus according to a preferred embodiment of the present invention.

FIG. 3 depicts another embodiment according to the invention for avoiding condensation, on the lens or pyrometer, of the vapours produced during the processing of the polymer. The gas of the construction-chamber atmosphere may be removed by suction (11), and conducted through a, for example, tubular component as deposition surface (13) with cooled areas on which the vapours produced during the process can condense, and then the gas is conducted back into the construction chamber (12). A dynamic compressor (14) is used to produce the flow. In a particularly preferred embodiment, the gas of the construction-chamber atmosphere may be reheated after condensation of the volatile constituents of the polymer (15), before being conducted back into the construction chamber. Before the gas is conducted back into the construction chamber it may be heated to a temperature which is at most 30° C. below the process temperature in the construction chamber. Preferably, the gas is heated to a temperature which is at most 20° C. below the process temperature. It is particularly preferable that the gas is heated to a temperature which is at most 10° C. below the process temperature. This measure minimizes the destruction of the construction process due to cooled gas in the construction chamber. This embodiment has the advantage that no relatively cold components are needed within the actual construction chamber and the construction process may therefore not be disrupted.

Figure 4:
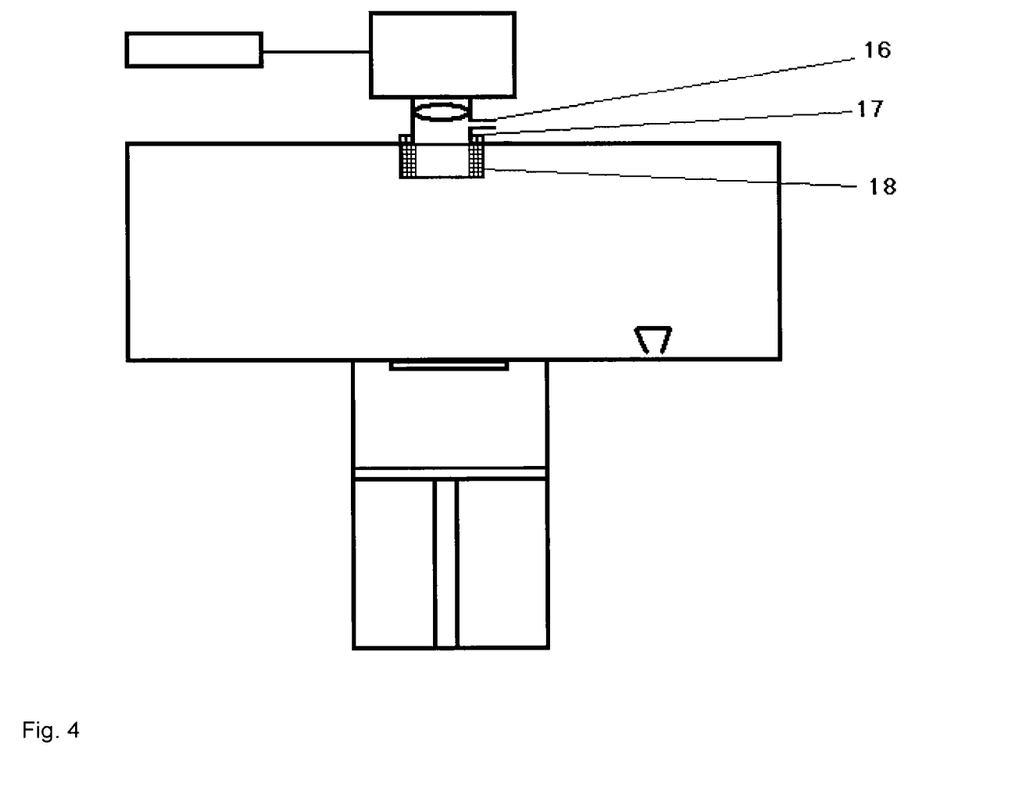
FIG. 4 a schematic diagram of a layer-by-layer production apparatus according to another embodiment of the present invention.

FIG. 4 shows another embodiment of the apparatus of the invention, which may avoid deposits on lens and on other sensitive components. A gas is also introduced (16) below the component to be protected, in particular the lens, and has lower density than the gas of the construction-chamber atmosphere. The gas with the lower density forms, under the component to be protected from deposition, a protective layer which inhibits deposition. It may be advantageous for this embodiment if the location of the component to be protected is at a position at maximum height which has minimum contact with the gas flows in the construction chamber, since the protective layer may be thus retained and does not require constant renewal. Helium may be a particularly attractive gas for the protective film, because of its low density and inertness. The protection from deposits can therefore be increased if the protective film made of a low-density inert gas (gas with density lower than that of the gas of the construction chamber) is combined with the deposition surfaces (18) and cooling elements (17).

If, by virtue of the measures according to the invention, the polymer vapours produced during processing are removed from the construction-chamber atmosphere before they can condense on the lens, it may no longer be necessary to flush the lens with inert gas, and the complicated engineering for lens flushing may be omitted. The lens may be cooled by simple thermal conduction. The gas for inertizing the construction chamber may be introduced at a point that is more advantageous for the construction process, and may be controlled to a higher temperature. The inert gas may be heated to a temperature which is at most 30° C. below the process temperature. It is preferable that the gas is heated to a temperature which is at most 20° C. below the process temperature. It is particularly preferable that the gas is heated to a temperature which is at most 10° C. below the process temperature. Optimized introduction of inert gas reduces the risk level inherent in the process, since undesired cooling of powder or melt may no longer occur.

Protection from deposits, in particular on lens and pyrometer, may be additionally increased if there is, between the sensitive components in the embodiments according to the invention, in particular between the lens and the construction chamber, a laser-permeable panel which separates the sensitive parts from the construction-chamber atmosphere. Deposits on the laser-permeable panel can be inhibited by the above-mentioned measures of the invention. It is advantageous if the laser-permeable panel is heated to a temperature which is at most 20° C. below the process temperature. It is particularly advantageous if the laser-permeable panel is heated to a temperature which is at most 10° C. below the process temperature.

The present invention equally provides processes for the layer-by-layer production of three-dimensional objects, where the process is carried out in an apparatus comprising a construction chamber (19) with an adjustable-height construction platform (6), and with an apparatus (7) for applying, onto the construction platform (6), a layer of a material hardenable by exposure to electromagnetic radiation, and with irradiation equipment comprising a radiation source (1) emitting electromagnetic radiation, and comprising a control unit (3), and comprising a lens (8) located in the beam path of the electromagnetic radiation, for the irradiation of points corresponding to the object (5) in the layer, where the apparatus has at least one deposition surface (9, 13, 18) located within the, or outside of the, construction chamber. A material hardenable by electromagnetic radiation is applied here onto the construction platform (6) and is irradiated with electromagnetic radiation from the radiation source (1). In the processes according to the invention, the deposition surface at which the vapours cool and on which they can condense is used to purify the construction-chamber atmosphere by removing vapours.

The process comprising:
applying a layer of a material which is hardenable by exposure to electromagnetic radiation onto the construction platform; focusing the beam of electromagnetic radiation through the lens on the material layer; selectively melting the material under the focus of the beam according to the control unit to obtain a completed layer; continuously adding a further layer of the material which is hardenable over the completed layer and repeating the controlled melting until the three dimensional object is formed. Throughout this process material vapours formed during the process condense and deposit on a deposition surface or on multiple deposition surfaces available to the process gases.

In a preferred embodiment of the process of the invention, material vapours formed during the process may be conducted by vacuum from the reaction chamber into piping, for example, as shown in FIG. 3 and to the deposition surface where at least part of the material vapours condense and deposit on the deposition surface and the gas which remains after the condensation is then conducted back into the construction chamber.

In another embodiment of the process according to the invention, the construction chamber may be heated by a heating element to a process temperature. The said process temperature may usually be in the range from 60 to 400° C., in particular from 120 to 330° C. and very particularly preferably in the range from 160 to 220° C.

In one embodiment of the process according to the invention, the gas of the construction-chamber atmosphere may conducted out of the construction chamber, and then conducted past the deposition surface, and then conducted back into the construction chamber. The temperature of the gas conducted back into the construction chamber may preferably be at most 30° C., in particular at most 20° C. and very particularly preferably at most 10° C., below the process temperature.

The deposition surface in the process according to the invention may generally be cooled to a temperature which is from 10° C. to 350° C., preferably from 20 to 200° C., with preference from 20° C. to 180° C., particularly preferably from 30° C. to 150° C., very particularly preferably from 30° C. to 140° C. and in particular from 30 to 80° C., below the process temperature.

The processes according to the invention which can produce mouldings according to the invention from powder are described in the Examples in more detail below, but without any intention that the invention be restricted thereto.

In principle, any of conventionally known polymer powders may be suitable as hardening materials according to the invention or in the process according to the invention. Thermoplastic and thermoelastic materials may particularly be suitable. Such materials include, for example, polyethylene (PE, HDPE, LDPE), polypropylene (PP), polyamides, polyesters, polyester esters, polyether esters, polyphenylene ethers, polyacetals, polyalkylene terephthalates, in particular polyethylene terephthalate (PET) and polybutylene terephthalate (PBT), polymethyl methacrylate (PMMA), polyvinyl acetal, polyvinyl chloride (PVC), polyphenylene oxide (PPO), polyoxymethylene (POM), polystyrene (PS), acrylonitrile-butadiene-styrene (ABS), polycarbonates (PC), polyether sulphones, thermoplastic polyurethanes (TPU), polyaryletherketones, in particular polyetheretherketone (PEEK), polyetherketoneketone (PEKK), polyetherketone (PEK), polyetheretherketoneketone (PEEKK), polyaryletheretheretherketone (PEEEK) or polyetherketoneetheretherketoneketone (PEKEKK), polyetherimides (PEI), polyarylene sulphides, in particular polyphenylene sulphide (PPS), thermoplastic polyimides (PI), polyamideimides (PAI), polyvinylidene fluorides, and also copolymers of the said thermoplastics, e.g. a polyaryletherketone (PAEK)/polyarylether sulphone (PAES) copolymer, mixtures and/or polymer blends. With particular preference, the polymer powder comprises at least one polyamide or polyetherketones, in particular nylon-12, nylon-6 or nylon-6,6 or PEEK, and the polyamides mentioned are particularly preferred here.

In operation, an engineering program may be first used to generate or store, in a computer, data concerning the shape of the object (5) to be produced. For the production of the object, the data are processed in such a way that the object is dissected into a large number of horizontal layers which are thin in comparison with the size of the object, and the shape data are provided for each of this large number of layers, for example in the form of data sets, e.g. CAD data. The generation and processing of the data for each layer here may take place prior to the production process or else simultaneously with the production of each layer.

The construction platform (6) is then first moved by the height-adjustment apparatus to the highest position, in which the surface of the construction platform (6) is in the same plane as the surface of the construction chamber (19), and is then lowered by an amount corresponding to the intended thickness of the first layer of material in such a way that, within the resultant aperture, a lowered region has been formed, delimited laterally by the walls of the aperture and below by the surface of the construction platform (6). A first layer of the material to be hardened, with the intended layer thickness, is then introduced by an applicator (7) into the cavity formed by the aperture and the construction platform (6), or into the lowered region, and is optionally heated by a heating system to a suitable operating temperature, for example from 140° C. to 160° C. The control unit (3) then controls the deflector device in such a way that the deflected light beam (2) successively impacts all points of the layer, and sinters or melts the material there. A solid basal layer can thus first be formed. In a second step, the construction platform (6) is lowered by means of the height-adjustment apparatus by an amount corresponding to one layer thickness, and a second layer of material is introduced by means of the applicator (7) into the resultant lowered region within the aperture, and optionally in turn heated by the heating system. In one embodiment, the control unit (3) can on this occasion control the deflector device in such a way that the deflected light beam (2) impacts only that region of the layer of material that is adjacent to the inner surface of the aperture, and hardens the layer of material there by sintering, thus producing a first annular wall layer with a wall thickness of about 2 to 10 mm which completely surrounds the remaining pulverulent material of the layer. This part of the control system is therefore a device for producing a container wall which surrounds the object (5) to be formed, simultaneously with the formation of the object in each layer.

Once the construction platform (6) has been lowered by an amount corresponding to the layer thickness of the next layer, and the material has been applied and heated in the same manner as above, the production of the object (5) itself may begin. For this, the control unit (3) controls the deflector device in such a way that the deflected light beam (2) impacts those points of the layer which, according to the coordinates stored for the object (5) to be produced in the control unit, are intended to be hardened. The procedure for the other layers is analogous. In the case of the desired production of an annular wall region in the form of a container wall which encloses the object together with the remaining, unsintered material and thus inhibits escape of the material when the construction platform (6) is lowered below the worktable, the device is used to sinter an annular wall layer onto the annular wall layer located thereunder for each layer of the object. Production of the wall can be omitted if a replaceable vessel according to EP 1037739, or a fixedly installed container, is used.

After cooling, the object formed can be removed from the apparatus.

The present invention likewise provides the objects produced by the processes according to the invention.

It is assumed that a person skilled in the art can use the above description to its fullest extent even in the absence of any further information. The preferred embodiments and examples are therefore to be interpreted merely as descriptive disclosure, and certainly not as in any way limited disclosure. Having generally described this invention, a further understanding can be obtained by reference to certain specific examples which are provided herein for purposes of illustration only, and are not intended to be limiting unless otherwise specified. Alternative embodiments of the present invention may be obtained in an analogous manner.

EXAMPLES

The examples are operated in accordance with the description below. The construction chamber is preheated for 180 min to a temperature 20° C. below the process temperature. The temperature in the construction chamber is then increased to the process temperature. The process temperature depended on the powder material used. When powder made of polymeric materials is processed, it is necessary to ensure that there is no excessively severe temperature drop in the construction area, since warpage of the components to be produced is otherwise excessive. The temperature distribution in the construction chamber is not always homogeneous, and the temperature measured by means of a pyrometer is therefore defined as construction-chamber/process temperature. Prior to the first exposure to light, 40 layers are applied without exposure to light. The component to be exposed to light is positioned centrally in the construction area. A square area with edge length 100 mm is melted by means of the laser. The construction platform (6) is then lowered by 0.15 mm, and a fresh powder layer is applied at a velocity of 100 mm/s by a layer applicator (7). The said steps are repeated until a three-dimensional object (5) of height 300 mm is produced. After the exposure to light has been concluded, 40 further layers are then applied before the heating elements of the apparatus are switched off and the cooling phase is introduced. The time needed for each layer during the entire construction process is below 40 seconds.

After a cooling time of at least 12 hours, the resultant component is removed and freed from adhering powder. The deposits on lens and pyrometer are assessed. A paper towel saturated with 98% ethanol is then used to clean lens and pyrometer. A PCE-ABZ 100C precision balance from PCE Instruments is used to weigh the paper before and after the cleaning process, in each case without ethanol. The difference between the two weighings gives the respective amount of deposit on lens and pyrometer.

Laser power is measured by a method based on ISO 11554 with an LM-1000 from Coherent Deutschland GmbH, and average power is stated here. The measurements are made in a laboratory at 23° C./50% humidity.

A white-light interferometer (FRT MicroProf®-Multisensor Surface Metrology Tool) is used to determine the warpage of the underside of the resultant component. The warpage measure used is the average height difference between the centre and the corners of the underside of the resultant component.

Example 1

Not According to the Invention

The construction process is carried out in an EOSINT P380 from EOS GmbH. A PA12 powder with the powder properties in Table 1 is processed. The process temperature is 170° C. The energy input from the laser is 60 mJ/mm² (laser power 36.0 W, scan velocity 2000 mm/s, distance between irradiation lines 0.3 mm). Heavy deposits are discernible on lens and pyrometer after the end of the construction process. Amount of deposit on lens: 0.009 g. The difference between the centre and the corners of the underside of the resultant component is 0.84 mm.

Example 2

Not According to the Invention

The construction process is carried out in an SPro60HDHS from 3d-systems. A PA12 powder with the powder properties in Table 1 is processed. The process temperature is 168° C. The energy input from the laser is 36 mJ/mm² (laser power 65.0 W, scan velocity 6000 mm/s, distance between irradiation lines 0.3 mm). Heavy deposits are discernible on the lens after the end of the construction process. Amount of deposit on lens: 0.007 g. The difference between the centre and the corners of the underside of the resultant component is 0.71 mm.

In Examples 1 and 2, attempts are made to direct a stream of inert gas onto the lens in such a way that the volatile constituents cannot condense on the lens. As shown by Examples 1 and 2 not according to the invention, this is not adequately successful. The inert gas, markedly colder than the construction chamber, also serves for the cooling of the lens.

Example 3

Not According to the Invention

The construction process is carried out in an EOSINT P380 from EOS GmbH. A PA6 powder with the powder properties in Table 2 is processed. The process temperature is 199° C. The energy input from the laser was 60 mJ/mm² (laser power 36.0 W, scan velocity 2000 mm/s, distance between irradiation lines 0.3 mm). Extremely heavy deposits are discernible on the lenses and pyrometer after the end of the construction process. Amount of deposit on each lens: 0.026 g. The difference between the centre and the corners of the underside of the resultant component is 0.94 mm.

Example 4

According to the Invention

The construction process is carried out in an EOSINT P380 from EOS GmbH. A PA12 powder with the powder properties in Table 1 is processed. The process temperature is 170° C. A cooled rectangular hollow body (9) according to FIG. 2 is incorporated in order to inhibit deposition on the lens. The wall of the rectangular hollow body (edge length 200 mm, height 70 mm) is composed of a plurality of plies of braided metal fabric (mesh width 400 μm, 4-ply, distance between the individual plies 1 mm, stainless steel). The rectangular hollow body made of braided metal fabric is cooled by means of thermal conduction via a suitable apparatus (10). The average temperature of the rectangular hollow body (9) during the construction process is 128° C. The energy input from the laser is 60 mJ/mm² (laser power 36.0 W, scan velocity 2000 mm/s, distance between irradiation lines 0.3 mm). After the end of the construction process, hardly any deposits are discernible on lens and pyrometer. In contrast, heavy deposits are discernible on the cooled rectangular hollow body. Amount of deposit on lens: 0.002 g. The difference between the centre and the corners of the underside of the resultant component is 0.83 mm.

Example 5

According to the Invention

The construction process is carried out in an SPro60HDHS from 3d-systems. A PA12 powder with the powder properties in Table 1 is processed. The process temperature is 168° C. A rectangular hollow body (9) according to FIG. 2 is incorporated in order to inhibit deposition on the lens. The wall of the rectangular hollow body (edge length 200 mm, height 70 mm) is composed of a plurality of plies of braided metal fabric (mesh width 400 μm, 4-ply, distance between the individual plies 1 mm, stainless steel). The rectangular hollow body made of braided metal fabric is cooled by means of thermal conduction via a suitable apparatus (10). The average temperature of the rectangular hollow body during the construction process is 103° C. The energy input from the laser was 36 mJ/mm² (laser power 65.0 W, scan velocity 6000 mm/s, distance between irradiation lines 0.3 mm). After the end of the construction process, hardly any deposits are discernible on the lens. Amount of deposit on lens: 0.001 g. The difference between the centre and the corners of the underside of the resultant component is 0.73 mm.

Example 6

According to the Invention

The construction process is carried out in an EOSINT P380 from EOS GmbH. A PA12 powder with the powder properties in Table 1 is processed. The process temperature is 170° C. An apparatus for purifying the construction-chamber atmosphere according to FIG. 3 is incorporated. The apparatus is composed of, respectively, a tube for extraction of the gas of the construction-chamber atmosphere from the construction chamber (11) and then for return, after treatment (12), where the input tube and extraction tube are positioned so as to be opposite one another. Polymer vapours produced during processing condense on the deposition surface (13), and the vapours are thus removed from the gas of the construction-chamber atmosphere. The component (13) is of tubular design with a diameter of 120 mm and a height of 100 mm, and is cooled in such a way that the temperature in the interior of the component is 108° C. There are braided metal fabrics (mesh width 400 μm, 5 plies, distance between the plies 1 mm, stainless steel) incorporated in the component. The gas is then reheated by means of a heating element (15) to a temperature close to the process temperature, before it is conducted back into the construction chamber. A dynamic compressor (14) provides input and extraction of the gas of the construction-chamber atmosphere. The energy input from the laser is 60 mJ/mm² (laser power 36.0 W, scan velocity 2000 mm/s, distance between irradiation lines 0.3 mm). No deposits are discernible on the lens after the end of the construction process. In contrast, heavy deposits are discernible on the cooled cylindrical braided metal fabric in the component (13). The difference between the centre and the corners of the underside of the resultant component is 0.35 mm.

Example 7

According to the Invention

The construction process is carried out in an EOSINT P360 from EOS GmbH. A PA12 powder with the powder properties in Table 1 is processed. The process temperature is 170° C. As depicted in FIG. 4, the lens is flushed by helium at a low volume flow rate (0.3 l/min) (16). The construction chamber outside of the construction area is inertized with nitrogen gas. The nitrogen gas is heated to 162° C. before it is conducted into the construction chamber. A rectangular deposition surface (18) is incorporated in order to inhibit deposition on the lens. The deposition surface is a hollow body. The wall of the rectangular hollow body (edge length 200 mm, height 70 mm) is composed of a plurality of plies of braided metal fabric (mesh width 400 μm, 4-ply, distance between the individual layers 1 mm, stainless steel). The rectangular hollow body made of braided metal fabric is cooled by means of thermal conduction via a suitable apparatus (17). The average temperature of the rectangular hollow body during the construction process is 126° C. The energy input from the laser is 60 mJ/mm² (laser power 36.0 W, scan velocity 2000 mm/s, distance between irradiation lines 0.3 mm). After the end of the construction process, hardly any deposits are discernible on lens and pyrometer. Amount of deposit on lens: 0.001 g. The difference between the centre and the corners of the underside of the resultant component is 0.42 mm.

Example 8

According to the Invention

The construction process is carried out in an EOSINT P380 from EOS GmbH. A PA6 powder with the powder properties in Table 2 is processed. The process temperature is 199° C. In a manner similar to that depicted in FIG. 4, the lens is flushed with helium at a low volume flow rate (0.3 l/min). The construction chamber outside of the construction area is inertized with nitrogen gas. The nitrogen gas is heated to 192° C. before it is conducted into the construction chamber. The energy input from the laser is 60 mJ/mm² (laser power 36.0 W, scan velocity 2000 mm/s, distance between irradiation lines 0.3 mm). Heavy fuming occurs during processing. After the end of the construction process, hardly any deposits are discernible on the lenses. Amount of deposit on each lens: 0.002 g. The difference between the centre and the corners of the underside of the resultant component is 0.48 mm.

Markedly less soiling of the lens is discernible in Examples 4-8 according to the invention than in the examples not according to the invention, under comparable conditions. Furthermore, the warpage of the resultant components in the examples according to the invention is not significantly greater, although the examples according to the invention used cooled surfaces. In Examples 6-8, the warpage of the resultant component is actually markedly reduced.

TABLE 1

Properties of PA12 powder

| | Value | Unit | Test type/Test equipment/Test parameters |
|---|---|---|---|
| Bulk density | 0.463 | g/cm³ | DIN EN ISO 60 |
| d50 Grain size | 56 | μm | Malvern Mastersizer 2000, dry measurement, 20-40 g of powder added by means of Scirocco dry dispersion equipment. Feed rate vibratory trough 70%, dispersion air pressure 3 bar. Specimen measurement time 5 seconds (5000 individual measurements), refractive index and blue-light value defined as 1.52. Evaluation by way of Mie theory. |
| d10 Grain size | 36 | μm | Malvern Mastersizer 2000, parameters: see d50 grain size |
| d90 Grain size | 79 | μm | Malvern Mastersizer 2000, parameters: see d50 grain size |
| <10.48 μm | 1.4 | % | Malvern Mastersizer 2000, parameters: see d50 grain size |
| Pourability | 27 | s | DIN EN ISO 6186, Method A, nozzle outlet diameter 15 mm |
| Solution viscosity | 1.60 | — | ISO 307, Schott AVS Pro, solvent acidic m-cresol, volumetric method, two measurements, dissolution temperature 100° C., dissolution time 2 h, polymer concentration 5 g/l, measurement temperature 25° C. |
| BET (spec. surface area) | 5.7 | m²/g | ISO 9277, Micromeritics TriStar 3000, nitrogen gas adsorption, discontinuous volumetric method, 7 measurement points at relative pressures P/P0 from about 0.05 to about 0.20, dead volume calibration by means of He(99.996%), specimen preparation 1 h at 23° C. + 16 h at 80° C. in vacuo, spec. surface area based on devolatilized specimen, evaluation by means of multipoint determination |

TABLE 1-continued

Properties of PA12 powder

| | Value | Unit | Test type/Test equipment/Test parameters |
|---|---|---|---|
| Melting point, 1$^{st}$ heating procedure | 186 | ° C. | DIN 53765 DSC 7 v. Perkin Elmer, heating/cooling rate 20 K/min |
| Recrystallization temperature | 141 | ° C. | DIN 53765 DSC 7 v. Perkin Elmer, heating/cooling rate 20 K/min |
| Conditioning of the material | Material is aged for 24 h at 23° C. and 50% humidity prior to processing | | |

TABLE 2

Properties of PA6 powder

| | Value | Unit | Test type/Test equipment/Test parameters |
|---|---|---|---|
| Bulk density | 0.468 | g/cm$^3$ | DIN EN ISO 60 |
| d50 Grain size | 64 | µm | Malvern Mastersizer 2000, dry measurement, 20-40 g of powder added by means of Scirocco dry dispersion equipment. Feed rate vibratory trough 70%, dispersion air pressure 3 bar. Specimen measurement time 5 seconds (5000 individual measurements), refractive index and blue-light value defined as 1.52. Evaluation by way of Mie theory. |
| d10 Grain size | 35 | µm | Malvern Mastersizer 2000, parameters: see d50 grain size |
| d90 Grain size | 84 | µm | Malvern Mastersizer 2000, parameters: see d50 grain size |
| <10.48 µm | 1.5 | % | Malvern Mastersizer 2000, parameters: see d50 grain size |
| Pourability | 29 | s | DIN EN ISO 6186, Method A, nozzle outlet diameter 15 mm |
| Solution viscosity | 1.63 | — | ISO 307, Schott AVS Pro, solvent sulphuric acid, volumetric method, two measurements, dissolution temperature 100° C., dissolution time 2 h, polymer concentration 5 g/l, measurement temperature 25° C. |
| BET (spec. surface area) | 0.7 | m$^2$/g | ISO 9277, Micromeritics TriStar 3000, nitrogen gas adsorption, discontinuous volumetric method, 7 measurement points at relative pressures P/P0 from about 0.05 to about 0.20, dead volume calibration by means of He(99.996%), specimen preparation 1 h at 23° C. + 16 h at 80° C. in vacuo, spec. surface area based on devolatilized specimen, evaluation by means of multipoint determination |
| Melting point, 1$^{st}$ heating procedure | 216 | ° C. | DIN 53765 DSC 7 v. Perkin Elmer, heating/cooling rate 20 K/min |
| Recrystallization temperature | 168 | ° C. | DIN 53765 DSC 7 v. Perkin Elmer, heating/cooling rate 20 K/min |
| Conditioning of the material | Material is aged for 24 h at 23° C. and 50% humidity prior to processing | | |

Numerous modifications and variations on the present invention are possible in light of the above teachings. It is therefore to be understood that within the scope of the appended claims, the invention may be practiced otherwise than as specifically described herein.

The invention claimed is:
1. An apparatus for layer-by-layer production of three-dimensional objects, comprising:
a radiation source which emits an electromagnetic radiation;
a control unit for control of a beam of the electromagnetic radiation;
a lens in a path of the electromagnetic radiation beam;
at least one deposition surface; and
a construction chamber, the construction chamber comprising:
an adjustable-height construction platform,
an apparatus for applying, onto the construction platform, a layer of a material hardenable by exposure to electromagnetic radiation during the production of three-dimensional objects on the construction platform, wherein the lens directs the beam of electromagnetic radiation to an object point of the layer of hardenable material on the construction platform, wherein vapours produced in the construction chamber during melting of the hardenable material circulate and is cooled in the construction chamber, thereafter condensing on the at least one deposition surface in a controlled manner, and wherein the at least one deposition surface is located within and outside the construction chamber and the at least one deposition surface is located at the top surface of the construction chamber.

2. The apparatus according to claim 1, wherein the deposition surface is located outside the construction chamber, and the apparatus further comprises:

piping leading from the construction chamber to the deposition surface, and piping leading from the deposition surface back into the construction chamber.

3. The apparatus according to claim 2, wherein the piping leading back into the construction chamber comprises a heating element.

4. The apparatus according to claim 1, wherein the deposition surface is cooled.

5. The apparatus according to claim 2, wherein the deposition surface is cooled.

6. The apparatus according to claim 1, which further comprises a heating element for controlling temperature within the construction chamber.

7. The apparatus according to claim 1, wherein an area of the deposition surface is larger than 10 000 mm$^2$.

8. The apparatus according to claim 1, wherein the deposition surface comprises a geometric body having a surface-to-volume ratio greater than 1 mm$^{-1}$.

9. The apparatus according to claim 1, wherein the construction chamber further comprises an inert gas, and a second inert gas having a density less than a density of the construction chamber inert gas is introduced to the apparatus at a position directly below the lens.

10. The apparatus according to claim 1, further comprising a laser-permeable panel between the lens and the construction chamber.

11. An apparatus for layer-by-layer production of three-dimensional objects, comprising:

a radiation source which emits an electromagnetic radiation;

a control unit for control of a beam of the electromagnetic radiation;

a lens in a path of the electromagnetic radiation beam;

at least one deposition surface; and a construction chamber, the construction chamber comprising:

an adjustable-height construction platform, an apparatus for applying, onto the construction platform, a layer of a material hardenable by exposure to electromagnetic radiation during the production of three-dimensional objects on the construction platform, wherein the lens directs the beam of electromagnetic radiation to an object point of the layer of hardenable material on the construction platform, wherein vapours produced in the construction chamber during melting of the hardenable material circulate and is cooled in the construction chamber, thereafter condensing on the at least one deposition surface in a controlled manner, and wherein the at least one deposition surface is located outside the construction chamber and gas of the construction-chamber atmosphere containing the material vapours is removed by a suction device, located at the top of the construction chamber, out of the construction chamber to contact the at least one deposition surface where the material vapours at least partially condense and deposit, and the gas which remains after the condensation is then conducted back into the construction chamber, wherein the suction device is connected to the at least one deposition surface and configured to remove vapours produced during the melting process.

* * * * *